Patented Feb. 15, 1944

2,341,593

UNITED STATES PATENT OFFICE 2,341,593

COMPOSITION FOR THE PRODUCTION OF PROTHESES

Max Burkhardt, Hanau-on-the-Main, Erich Czapp, Frankfort-on-the-Main, and Alfred Jedele, Hanau-on-the-Main, Germany; vested in the Alien Property Custodian No Drawing. Application June 22, 1940, Serial No. 341,900. In Germany August 10, 1939

1 Claim. (Cl. 260—36)

This invention relates to a composition usable in a process for the production of protheses and more specifically for the production of protheses for dental purposes in which process polymerized and polymerisable organic compounds are used, for example polystyrol, polyvinyl and polyacryl compounds. Of the polyacryl compounds the most important are polymethacrylic compounds.

The use of the invention effects an improvement of those processes in which the polymerized and polymerisable organic substances are worked up by pressing them to the desired shape in a two-part mold manufactured of water-containing masses, for instance a two-part gypsum mold. In such processes, the material is brought into the mold either when in a solid, already polymerized state or as a mixture of a solid polymerisate and a liquid compound being either monomeric or only partially polymerized but capable of being hardened by polymerisation. In the first case, the pressing of the mass is effected at temperatures at which the solid substances become thermoplastic, and in the second case, at temperatures at which the paste from polymeric and monomeric compounds is polymerized thoroughly.

Particularly, the invention relates to a composition for the production of protheses comprising polymerized and polymerisable materials in which a mixture of solid polymeric and liquid monomeric or only partially polymerized acryl compounds, for example methyl methacrylate, is polymerized. But the invention may also be employed when working up other polymerisable organic compounds to protheses.

An object of the present invention is a process for the production of protheses from polymerized and polymerisable organic compounds in which the polymerisates and the polymerisable monomeric organic compounds respectively are freed from the undesirable susceptibility to water. For the processes heretofore known have shown that such organic compounds are susceptible to water when being heated, insofar as they tend to become milky or stained so that one was compellled either to dry the gypsum molds into which the mass is pressed by heating them up to temperatures of more than 100° C. or to protect the inner surfaces of the molds by a waterproof coating, for example, by a thin metal foil. This procedure, however, involves an additional waste of time and material.

A further object of the invention is to eliminate discolorings and to avoid the wearisome insulating of the gypsum mold in the production of protheses from polymerized and polymerisable organic compounds.

The above objects are accomplished, according to the present invention, by adding hydrophobic organic compounds that are soluble in the starting material of the artificial resin or that are at least emulsive therein.

Amongst the hydrophobic organic compounds, those have proved as specially adapted to fulfill the intended purpose which diminish the viscosity of the paste of artificial resin; for it has been found that, if the viscosity of the pasty mixture from a polymerisate and a monomeric polymerisable substance is diminished, the mixture flows more easily, presses more closely to the gypsum mold and eliminates thereby the formation of bubbles that cause the entrance of water and, therefore, discoloring of the mass. Furthermore, it has been found that even such hydrophobic organic substances are suitable for the intended purpose that change the surface tension and show capillary working in the mixture of artificial resin. These substances cause a closer communication between the artificial resin and the mold and prevent, therefore, the penetration of water.

Substances that improve the properties of the polymerisate and the polymerisable material are, for example: carbocyclic, aromatic and hydroaromatic, but also aliphatic hydrocarbons, especially such hydrocarbons bearing a side-chain, as for instance a residue of methyl, ethyl or propyl. Instead of hydrocarbons such derivatives thereof may be used in which one or several atoms of hydrogen on the hydrocarbon skeleton are substituted by groups that are chemically not very active. In general, the effect attained thereby is increasing parallel to the molecular value. For instance, an addition of benzol is not very effective, an addition of naphthalene more effective, and an addition of anthracene yet more effective. 2 parts by weight of an addition of anthracene produces the same effect as 15 parts by weight of an addition of naphthalene.

The said carbocyclic compounds may be replaced by heterocyclic mother substances and compounds derived therefrom by substituting atoms of hydrogen by groups being chemically relatively inactive.

Groups being chemically relatively inactive are, for example: the keto-group, the hydroxyl-group and the ester-groups.

These additions may be made each per se or several at the same time. It may be expedient to add two or more additions, for instance for the reason that it is possible, in this case, to graduate the softening effect corresponding to the individual requirements.

The special effect according to the invention is attained when using a mixture from a solid polymerisate and a liquid monomeric or partially polymerized but polymerisable substance, particularly compounds of the vinyl and acryl group, preferably methacrylic acid esters.

For instance, according to the invention, substances such as paraffine, vaseline, octane, acetoacetic acid ester, colophony, turpentine oil, benzol, toluol, xylol, mesitylene, cumol, benzyl alcohol, salicylic acid, naphthalene, diphenyl, diphenyl methane, benzophenone, anthracene, ethyl ester of phenylacetic acid, benzyl ester of phenylacetic acid, diethyl ester of phthalic acid and tricresyl phosphate, are added to the starting materials of the artificial resins. The additions of these hydrophobic substances to the starting materials of the artificial resin amount to 0.1 to 40%, in general 2 to 15% of the starting materials.

The addition of the substances avoiding discoloring to the mixture of solid and liquid acrylates takes place when the substances of solid and liquid acrylates are mixed or, preferably, before the mixing. In the latter case, solid additions, for example naphthalene, are suitably added to the solid polymeric acryl compound, and liquid additions, for example mesitylene, are suitably added to the still liquid monomeric acryl compound.

Besides the additions according to the invention, also known additions common in the art, such as polymerisation catalysts, softeners, coloring matters, and fillers may be added to the acryl compounds.

In order to illustrate the invention the following examples are given:

Example 1

85 parts of solid polymerized ester of methyl methacrylate and 15 parts of naphthalene are mixed with such a quantity of liquid monomeric ester of methyl methacrylate as to form a tough paste. This paste is pressed in a two-part gypsum mold such as is commonly used for the production of dental rubber protheses; the two parts of the mold are pressed together and the filling is polymerized by putting the mold into boiling water, for half an hour. After polymerisation, the prothesis is removed from the gypsum mold and then finished and polished.

In order to facilitate the removal of the casting from the mold and the finishing of the prothesis it is advisable to line the walls of the gypsum mold, before the mixture is embedded, with an organic varnish or with waterglass, particularly waterglass of a special alkaline strength. This lining facilitates the removal of the gypsum baking on the polymerized prothesis and helps to obtain a specially true copy.

Example 2

Instead of the methacrylic acid methyl ester used according to Eample 1, a mixture of 80 parts of methacrylic acid methyl ester and 20 parts of acrylic acid butyl ester is used. 10 parts of benzyl alcohol are added to the liquid mixture of these two esters and the substance is then mixed with such a quantity of solid polymerized mixture of the said esters as to form a tough paste. This paste is worked up to a prothesis in the same manner as described in Example 1.

Example 3

The following other additions are, for instance, used instead of the before mentioned additions of 20 parts of naphthalene or 10 parts of benzyl alcohol:

|  | Parts |
|---|---|
| Benzol | 33 |
| Anthracene | 2 |
| Benzophenone | ½ |
| Toluol | 20 |
| Xylol | 17 |
| Mesitylene | 17 |
| Cumol | 20 |

Example 4

2 parts of liquid paraffine are dissolved in 98 parts of monomeric methacrylic acid methyl ester and this liquid is stirred with 200 parts of solid polymerized methacrylic acid methyl ester, finally with the addition of a small quantity of a catalyst, as benzoyl peroxide. This paste is pressed into a two-part gypsum mold. The two parts of the mold are then pressed together, thereupon polymerisation takes place by placing the mold into boiling water, for half an hour. After cooling and removing from the mold the prothesis is obtained without defect.

In this way protheses are obtained showing neither stains nor discolorings without making necessary a wearisome lining of the gypsum mold with a tin foil.

Instead of methacrylic acid methyl ester also a mixture of 80 parts of methacrylic acid methyl ester and 20 parts of acrylic acid butyl ester can be used in the last mentioned example.

Furthermore, in the last example the solution of 2 parts of paraffine in the monomeric methacrylic acid methyl ester can also be substituted by the following solutions in the monomeric methacrylic acid methyl ester:

A solution of—

|  | Parts |
|---|---|
| Octane | 10 |
| Ester of aceto-acetic acid | 10 |
| Colophony | .5 |
| Turpentine oil | .5 |
| Ethyl ester of phenylacetic acid | 2 |
| Benzyl ester of phenylacetic acid | 2 |

These additions to the starting materials of the artificial resins avoid any discoloring and the formation of stains if the castings of artificial resin are produced, for instance, from vinyl or acryl compounds, such as methacrylic acid esters, in the usual manner by heating in gypsum molds. Furthermore, the additions prevent the formation of bubbles, especially in castings of larger size.

For the production of protheses, of course, such substances are selected as are physiologically harmless for the intended purpose.

We claim:

A moldable compound for the production of protheses, comprising a mass of moldable material of polymerized methacrylic acid methyl ester and acrylic acid butyl ester combined with a minor proportion of benzophenone adapted to cause the molding compound to shape itself more exactly to the formation of the mold.

MAX BURKHARDT.
ERICH CZAPP.
ALFRED JEDELE.